(12) United States Patent
Braun et al.

(10) Patent No.: US 8,402,038 B1
(45) Date of Patent: Mar. 19, 2013

(54) METHOD AND SYSTEM FOR DATA ALLOCATION

(71) Applicants: Andrew T. Braun, Cherry Hill, NJ (US); James T. Sullivan, Braintree, MA (US); Harsha B. Gurumurthy, Franklin, MA (US); Charlene X. Liang, North Andover, MA (US); David D. Harter, Hingham, MA (US)

(72) Inventors: Andrew T. Braun, Cherry Hill, NJ (US); James T. Sullivan, Braintree, MA (US); Harsha B. Gurumurthy, Franklin, MA (US); Charlene X. Liang, North Andover, MA (US); David D. Harter, Hingham, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/650,262

(22) Filed: Oct. 12, 2012

(51) Int. Cl.
*G06F 17/30* (2006.01)

(52) U.S. Cl. ..................................................... 707/754

(58) Field of Classification Search .................. 707/603, 707/607, 754
See application file for complete search history.

(56) References Cited

U.S. PATENT DOCUMENTS

| | | | | |
|---|---|---|---|---|
| 5,970,476 A | * | 10/1999 | Fahey | 705/28 |
| 6,029,178 A | * | 2/2000 | Martin et al. | 1/1 |
| 6,609,123 B1 | * | 8/2003 | Cazemier et al. | 1/1 |
| 6,611,838 B1 | * | 8/2003 | Ignat et al. | 1/1 |
| 6,668,253 B1 | * | 12/2003 | Thompson et al. | 1/1 |
| 6,714,979 B1 | * | 3/2004 | Brandt et al. | 709/225 |
| 7,260,777 B2 | * | 8/2007 | Fitzsimons et al. | 715/255 |
| 7,720,804 B2 | * | 5/2010 | Fazal et al. | 707/601 |
| 7,814,470 B2 | * | 10/2010 | Mamou et al. | 717/162 |
| 8,302,030 B2 | * | 10/2012 | Soroca et al. | 715/810 |
| 2003/0061225 A1 | * | 3/2003 | Bowman et al. | 707/100 |
| 2003/0172368 A1 | * | 9/2003 | Alumbaugh et al. | 717/106 |
| 2003/0216966 A1 | * | 11/2003 | Saenz et al. | 705/14 |
| 2004/0254948 A1 | * | 12/2004 | Yao | 707/101 |
| 2007/0100793 A1 | * | 5/2007 | Brown et al. | 707/2 |
| 2009/0125796 A1 | * | 5/2009 | Day et al. | 715/219 |
| 2011/0307828 A1 | * | 12/2011 | Chilimbi et al. | 715/802 |

\* cited by examiner

*Primary Examiner* — Jorge A Casanova

(74) *Attorney, Agent, or Firm* — Proskauer Rose LLP

(57) ABSTRACT

A computer-implemented method is provided for allocating input data. The method includes receiving (1) the input data comprising source data and driver data, and (2) one or more user-specified parameters for allocating the input data. The method includes configuring a set of rule metadata based on the one or more user-specified parameters. The method also includes filtering at least one of the source data or the driver data based on the rule metadata to generate at least one of filtered source data or filtered driver data. The method further includes processing at least one of the filtered source data or the filtered driver data to generate target data and storing at least one of the filtered source data, the filtered driver data or the target data in separate operational tables in a database.

18 Claims, 3 Drawing Sheets

US 8,402,038 B1

METHOD AND SYSTEM FOR DATA ALLOCATION

FIELD OF THE INVENTION

The invention relates generally to computer-implemented methods and apparatuses, including computer program products, for allocating data based on user-configurable allocation rules.

BACKGROUND OF THE INVENTION

Allocation or manipulation of data from various data sources is important in many industrial and financial applications. For example, profitability analysis involving data allocation allows an organization to determine the true cost of products or services. Existing allocation tools, however, do not provide a solution that is configurable, scalable and maintainable. Specifically, existing allocation tools can only provide static dimensional data modeling and rigid hierarchical filtering options.

SUMMARY OF THE INVENTION

A configurable allocation tool is needed that is easy to maintain, scalable, and fast to deploy. The allocation tool of the present invention offers a user-configurable, metadata-driven application for implementing data allocation. This allocation tool can process input data from disparate sources, tune processing to use only relevant data, calculate allocation drivers, and obtain results that satisfy user-defined specifications. The allocation tool is capable of accommodating and processing allocations of multi-dimensional, large data sets. The allocation tool provides users with flexible control over processing, re-processing and/or exception processing. In addition, the allocation tool can be implemented on a consolidated platform that supports serial or parallel processing, which provides transparency, visibility and efficiency for monitoring end-to-end processes.

In one aspect, a computer-implemented method is provided for allocating input data. The method includes receiving (1) the input data that includes source data and driver data, and (2) one or more user-specified parameters for allocating the input data. The method includes configuring rule metadata associated with an allocation rule based on the one or more user-specified parameters. The method also includes filtering at least one of the source data or the driver data based on the rule metadata to generate at least one of filtered source data or filtered driver data. The method further includes processing at least one of the filtered source data or the filtered driver data to generate target data and storing at least one of the filtered source data, the filtered driver data or the target data in separate operational tables in a database.

In another aspect, a system for allocating input data is provided. The system includes an interface for receiving (1) the input data that includes source data and driver data, and (2) one or more user-specified parameters for allocating the input data. The system includes a rule definition module for configuring rule metadata associated with an allocation rule based on the one or more user-specified parameters. The system also includes an allocation engine configured to 1) filter at least one of the source data or the driver data based on the rule metadata to generate at least one of filtered source data or filtered driver data, and 2) process at least one of the filtered source data and the filtered driver data to generate target data. The system further includes a data warehouse for storing at least one of the filtered source data, the filtered driver data or the target data in separate operational tables. In some embodiments, the system further includes a database for storing the user-specified parameters and the rule metadata, the database being located in the data warehouse.

In yet another aspect, a computer program product, tangibly embodied in a computer readable medium, is provided for allocating input data. The computer program product includes instructions being operable to cause data processing apparatus to receive (1) the input data including source data and driver data, and (2) one or more user-specified parameters for allocating the input data. The computer program product includes instructions being operable to cause data processing apparatus to configure rule metadata associated with an allocation rule based on the one or more user-specified parameters and filter at least one of the source data or the driver data based on the rule metadata to generate at least one of filtered source data or filtered driver data. The computer program product further includes instructions being operable to cause data processing apparatus to process at least one of the filtered source data or the filtered driver data to generate target data and store at least one of the filtered source data, the filtered driver data or the target data in separate operational tables in a database.

In other examples, any of the aspects above can include one or more of the following features. In some embodiments, the rule metadata defines at least one of: 1) a filtering method for filtering at least one of the source data or the driver data, 2) an allocation method for processing at least one of the filtered source data or the filtered driver data, or 3) the operational tables for storing at least one of the source data, the filtered source data, the driver data, the filtered driver data or the target data.

In some embodiments, the rule metadata defines a standard filtering method or a custom filtering method for filtering at least one of the source data or the driver data. The standard filtering method can allow a user to select one or more dimensions, hierarchies, or members of the source data or the driver data to include or exclude in the corresponding filtered source data or filtered driver data. The standard filtering method can allow a user to filter the source data or the driver data at a state associated with a predetermined time. The predetermined time can include one of: a time of execution, a periodic time, or a user-specified time. In addition, the standard filtering method can allow a user to filter the source data or the driver data by a business attribute. The custom filtering method can allow a user to define one or more criteria for selecting at least a portion of the source data or the driver data to include or exclude in the corresponding filtered source data or filtered driver data.

In some embodiments, processing at least one of the filtered source data or the filtered driver data includes applying an allocation approach to at least one of the filtered source data or the filtered driver data. The allocation approach can include a subtraction rule, a percent distribution rule, a sourcing rule, a division rule or a multiplication rule. The allocation approach can be defined by the rule metadata based on the one or more user-specified parameters. For example, processing the filtered source data and the filtered driver data can include joining at least a portion of the filtered source data and at least a portion of the filtered driver data based on an allocation approach to generate the target data.

In some embodiments, at least one of the source data, the filtered source data, the driver data, the filtered driver data or the target data is used as input data for a different allocation execution.

In some embodiments, the rule metadata specifies which of the operational tables to store at least one of the source data, the filtered source data, the driver data, the filtered driver data or the target data.

In some embodiments, the rule metadata is also stored in the database. The rule metadata is capable of being used in a different allocation execution. In some embodiments, the database is implemented in massively parallel computing architecture.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DESCRIPTION OF THE INVENTION

Figure 1:
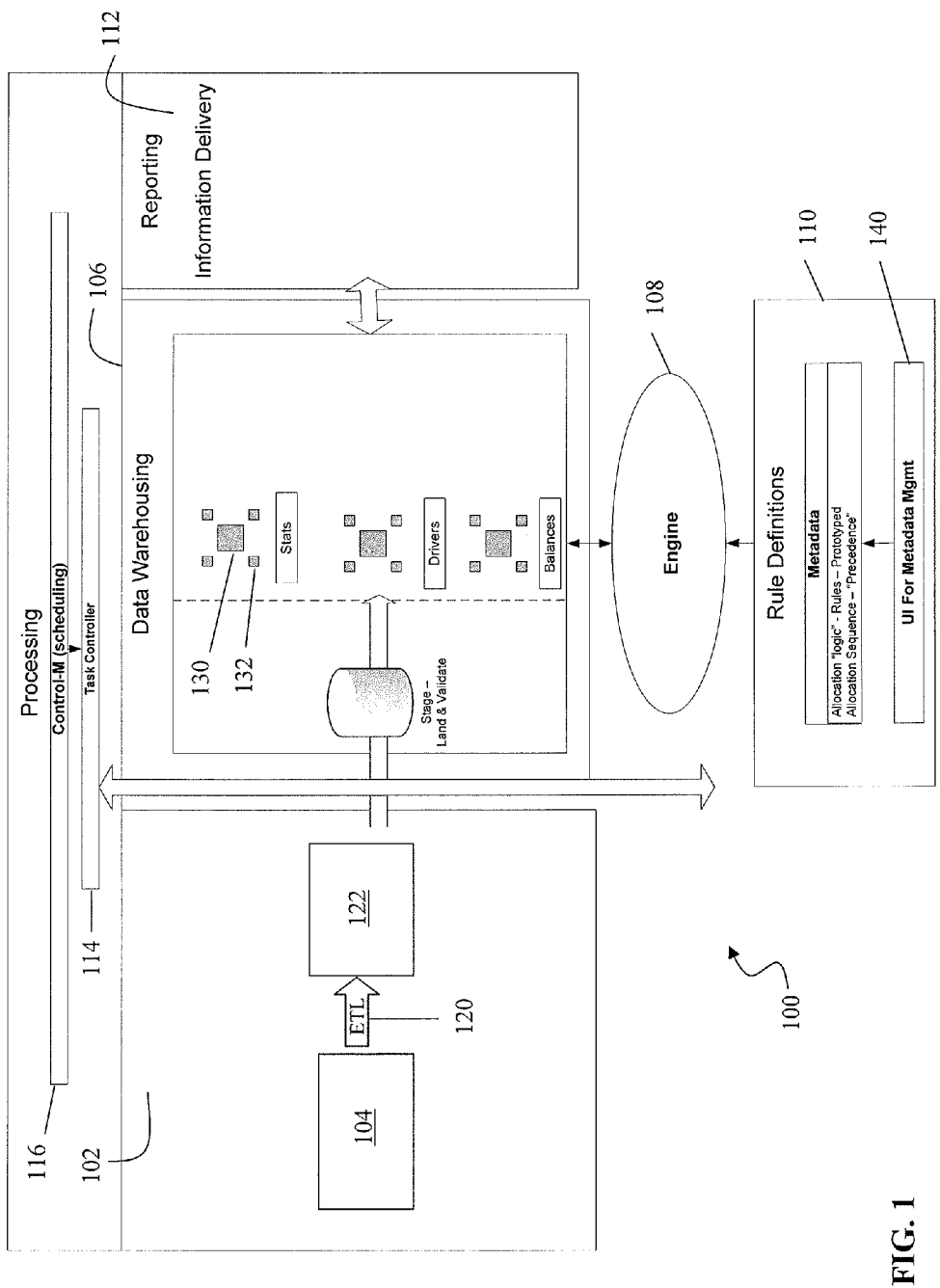
FIG. 1 shows an exemplary allocation tool in accordance with some embodiments of the present invention.

FIG. 1 shows an exemplary allocation tool in accordance with some embodiments of the present invention. The allocation tool 100 includes an data input module 102 for extracting data from one or more external sources 104 and loading the extracted data into a warehouse module 106 for use by an allocation engine 108. The allocation engine 108 is configured to process at least a portion of the data in the warehouse module 106, perform allocation calculations on the processed data based on rule metadata generated by the rule definition module 110, and store the resulting data in the warehouse module 106 for any subsequent allocation processing or reporting. The data operated upon by the allocation engine 108 in a given allocation operation can be categorized into source data and/or driver data, based on which allocation results (herein referred to as target data) are generated using an allocation rule.

The allocation tool 100 also includes a reporting module 112 for delivering at least one of the source, driver, or target data to a user. The reporting function can be implemented by a reporting tool such as the Oracle Business Intelligence (OBI) suite. In addition, the allocation tool 100 includes a user interface 116 for receiving runtime parameters from a user and a task controller 114 for launching the allocation engine 108 in response to the inputs from the user interface 116. The task controller 114 is also in communication with the rule definition module 110, which allows a user to submit parameters for configuring one or more allocation rules as well as instructions for grouping and sequencing allocation rules via the user interface 140.

In some embodiments, the data input module 102 uses an extract-transform-and-load (ETL) tool 120 to extract data from one or more external sources 104, transform the extracted data into at least one preferred data format, and load the transformed input data 122 to one or more tables in the warehouse module 106 for data storage. The ETL tool 120 can transform the extracted data into input data 122 of one or more desired formats including, for example, General Ledger (GL) balances or project cost data compatible with the Oracle eBusiness Suite.

In some embodiments, the warehouse module 106 is configured to store the input data 122 as well as data generated by the allocation engine 108 when performing allocation calculations. The warehouse module 106 can store such data using any data storage scheme, such as in star schemas, which include at least one fact table 130 referencing any number of dimension tables 132.

The rule definition module 110 allows a user to enter or select, via the user interface 140, one or more parameters for defining an allocation rule usable by the allocation engine 108 to allocate source and/or driver data. An allocation rule can represent a single allocation operation. By setting different parameters associated with a rule, a user can specify the source and/or driver data to operate on and define the conditions based on which selected source data and/or driver data is distributed to obtain desired target data. For example, a rule can include parameters defining at least one of: 1) a filtering method for selecting a subset of the source data or the driver data, 2) an allocation method for processing the filtered source data and/or the filtered driver data to generate target data, or 3) the operational tables in the warehouse module 106 that store at least one of the source data, the filtered source data, the driver data, the filtered driver data or the target data. In general, an allocation rule of the present invention utilizes user-configurable inputs to define data allocation. In some embodiments, user inputs for setting the allocation parameters are stored as metadata in the rule definition module 110. During run time, the allocation engine 108 can read the stored metadata corresponding to an allocation rule and dynamically generate execution codes, such as codes in the Structured Query Language (SQL), for implementing data allocation at run time.

In some embodiments, the allocation tool 100 can process multiple allocation rules in parallel. For example, the allocation tool 100 can be implemented on massively parallel computing architecture. Alternatively, the allocation tool 100 can process rules serially, one rule at a time. In some embodiments, the allocation tool 100 can identify and organize processing to support dependent relationships between rules. In some embodiments, the allocation tool 100 logically groups and sequences a collection of rules, referred to as a rule set, to facilitate processing of related rules. The allocation tool 100 can further group and sequence multiple rule sets, referred to as a super rule set, to further facilitate allocation processing. A user can specify which rules belong to a rule set or a super rule set via the interface 116 in communication with the task controller 114. In some embodiments, the task controller 114 controls processing of rules, rule sets and rule super sets. Conversely, the allocation tool 100 can also reverse existing rules, rule sets or rule super sets.

In some embodiments, the allocation tool 100 is implemented on the Netezza architecture. Employing such a platform for allocation processing is advantageous because of its ability to process a large volume of data quickly and accurately. For example, once an allocation execution instruction is created per rule definition, the Netezza platform can execute the entire data set using its massively parallel processing (MPP) power. Such an implementation maximizes computational performance by using mostly set-based operations to take advantage of the MPP architecture. It is understood by a person of ordinary skill in that art that other architecture with similar data processing abilities can also be employed and are within the spirit of the current invention.

In some embodiments, an allocation rule includes parameters for defining data filtering on user specified source or driver data. Filtering of source or driver data are implemented for two purposes: 1) to identify the set of data to be processed in an allocation stage and 2) to reduce data volume carried through the allocation process to improve computational speed. There are three settings selectable by a user via the task controller 114 to filter source or driver data. These settings include no filtering, standard filtering, or custom filtering. The no filtering option indicates that no filtering is required of the corresponding data. Hereinafter, filtered data includes a set of data when no filtering is applied.

The standard filtering option allows a user to select one or more dimensions, hierarchies, or members of the source data or the driver data to include or exclude in the corresponding filtered source data or filtered driver data. For example, a user can specify a node value in the data dimension hierarchy. Data members including and below the node are included or excluded from the filtered data. A user is also permitted to specify multiple node values corresponding to different branches of a data set and the resulting filtered data is a union of all the data from the different branches. In addition, the standard filter can allow a user to filter the source data or the driver data as it appears at a predetermined time, such as at a time of execution, a periodically-occurring time, or a user-specified time. The time of execution refers to using the data at the time of execution of the allocation method based on a current state of the data. The periodically-occurring time refers to using a set of data as it appears at the end of a time period, such as the data at the end of a fiscal period. The user-specified time refers to using a set of data as it appeared at a specific point in time. In addition, the standard filtering allows a user to filter the source data or the driver data by one or more business attributes, such as by organizational division codes, job functions, and/or unit managers.

The custom filtering option allows a user to define one or more criteria for selecting at least a portion of the source data or the driver data to include or exclude in the corresponding filtered source data or filtered driver data. A custom filter can be applied through a two-step process. First, a predefined set of data (e.g., cost pool mapping data) is stored in one or more designated tables in the warehouse module 106. Second, a user selects desired sections (e.g., key fields) of the predefined data set to included in the filtered data by defining one or more selection criteria (e.g., rules that match certain key fields of the predefined data set).

If a user selects either a standard or custom filtering option for configuring an allocation rule, the allocation engine 108 is adapted to create metadata to perform the filtering by defining a mapping operation and a join operation. The mapping operation determines which data from which table to select. The join operation combines the selected data by recognizing their shared feature(s).

In some embodiments, an allocation rule includes parameters for defining a method for processing the filtered driver and/or source data, such as specifying how the filtered source and driver data are joined to form target data. Exemplary allocation methods include a subtraction method, a percent distribution method, a sourcing method, a division method or a multiplication method. According to the percent distribution method, filtered driver data is transformed into relative percentages, then aligned with and multiplied to filtered source data. According to the subtraction method, filtered driver data is aligned with and subtracted from filtered source data. Such subtraction can be performed by multiplying the filtered driver data by −1 and summing the result with the filtered source data. According to the sourcing method, filtered source data can be mathematically transformed for use in subsequent processing. For example, data can be added to the filtered source data that is later used to align with driver data in another allocation calculation. In some examples of the sourcing method, filtered source data is simply copied without performing any mathematical manipulation. According to the division method, filtered driver data is aligned with and divided from filtered source data. According to the multiplication method, filtered driver data is aligned with and multiplied to filtered source data. In some exemplary applications, the division method can be used to compute per unit costing and the multiplication method can be used to compute standard costing.

In some embodiments, an allocation rule includes parameters defining the location of one or more operational tables in the warehouse module 106 used to store at least one of source data, filtered source data, driver data, filtered driver data and/or target data. Specifically, for source and driver data, a user can specify the location of the data in the warehouse module 106 based on which allocation is performed. For example, the source and/or driver data can be a portion of data stored in the warehouse module 106 associated with another allocation process. Alternatively, the user can supply the source or driver data via the data input module 102. In some embodiments, a user can store data generated during processing of an allocation rule in the warehouse module 106. For example, under a percent distribution method, filtered driver data is transformed into relative percentages as numerators and denominators. Hence, one or more operational tables can be used to store the numerator and denominator data. These tables can be temporary, e.g., deleted after allocation processing or stored on a more permanent basis. In some cases, one or more interim results generated during an allocation operation, such as results generated by filtering, can be stored in the warehouse module 106 for auditing and/or validation purposes.

In response to one or more run-time parameters entered by a user via the interface 116, the task controller 114 can instruct the allocation engine 118 to perform data allocation operations. These run-time parameters, including, for example, fiscal period or business organization division, are provided at runtime to further inform the allocation results or restrict the filtered data. For example, during run time, the allocation engine 108 reads the stored metadata corresponding to an allocation rule, a rule set, or a super rule set and dynamically generates execution codes, such as SQL codes, for implementing data allocation at run time. To store data generated by an allocation operation, the allocation engine 108 generally creates a greater number of smaller, but denser operational tables as oppose to a smaller number of larger and sparser tables. By relying on the principle that processing of smaller tables is generally fast and more efficient than processing larger tables, the allocation engine 108 is adapted to create a new operational table if doing so would i) yield a shorter development cycle and reduce implementation cost, ii) keep logical complexity of the allocation model manageable or iii) keep the allocation engine 108 lean to maximize processing. In some embodiments, the allocation engine 108 stores data generated from rule processing during a particular execution cycle or for a particular owner in one or more temporary operational tables. At the end of the execution cycle, the allocation engine 108 copies the data from the temporary operational tables to one or more tables in the warehouse module 106, from which an end user can access the data via the reporting module 112. After the data in the temporary operational tables are loaded into the warehouse module 106, the data can be deleted. In some embodiments, data from an earlier allocation operation related to an identical user request may not be deleted from the warehouse module 106 until new data is available.

Figure 2:
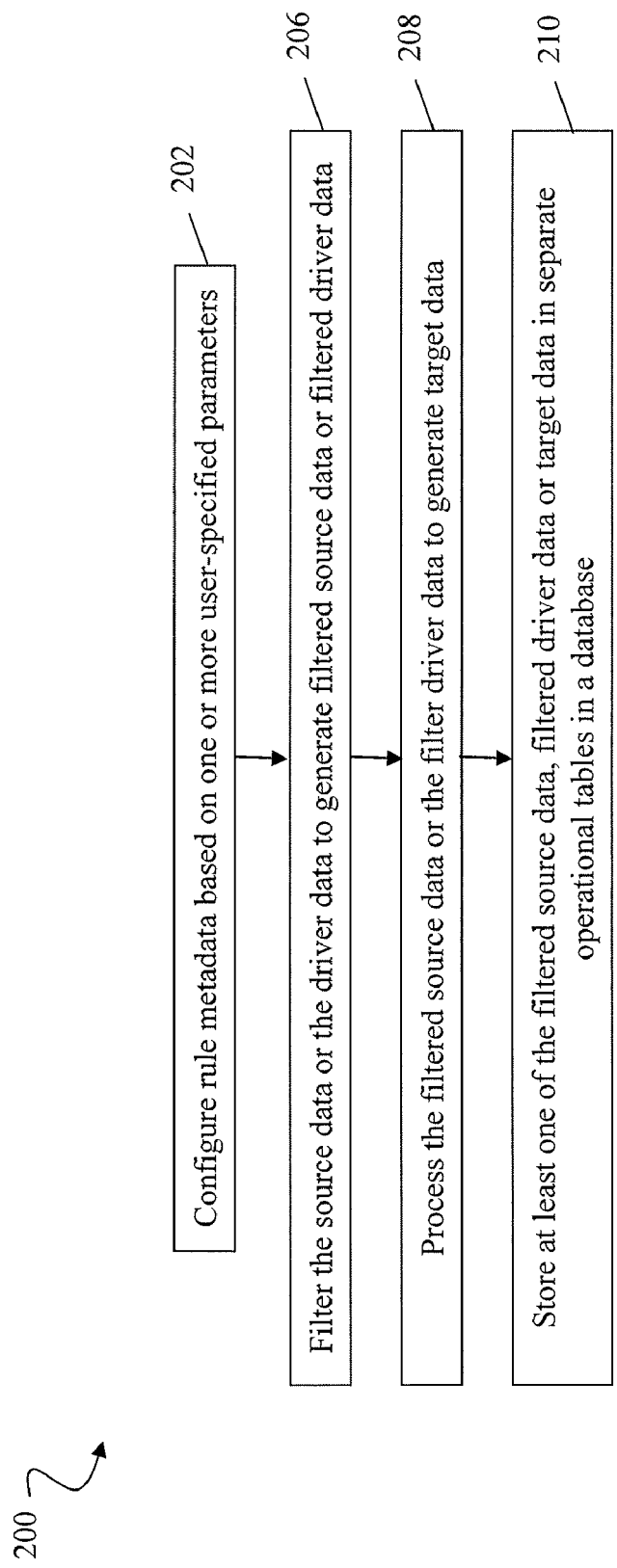
FIG. 2 shows an exemplary procedure executed by the allocation tool of FIG. 1 for processing an allocation rule.

FIG. 2 shows an exemplary procedure 200 executed by the allocation tool 100 for processing an allocation rule. At step 202, the rule definition module 110 generates metadata for an allocation operation based on user-specified inputs for configuring parameters of the allocation operation. The inputs can include values for setting parameters that identify i) the source data and/or driver data involved in the allocation operation, ii) the methods for filtering the source and/or driver data, and iii) the method for manipulating the source and/or driver data to generate target data. In some embodiments, the source data and/or driver data are preloaded into one or more operational tables of the warehouse module 106. Alternatively, the user can supply the source and/or driver data to the allocation tool 100 via the input module 102. The interface 116 can forward the user inputs to the task controller 114 for further processing.

At run time, the allocation engine 108 reads the corresponding metadata and implements the desired allocation operation by dynamically generating executable SQL codes. Specifically, when executing an allocation operation, the allocation engine 108 can filter user-specified source data or driver data to generate filtered source data and/or filtered driver data at step 206. The allocation engine 108 can filter (e.g., apply custom filtering, standard filtering or no filtering) each type of data based on the user-defined parameters corresponding to the filtering options. Data filtering is not mandatory, as the user can select no filtering as an option. In some embodiments, a user can specify filtering of only one of the source data or the driver data. In some embodiments, a user can choose to apply different filtering methods to filter the source and driver data.

At step 208, the allocation engine 108 can process the filtered source data and the filtered driver data to generate target data. The allocation engine 108 can apply an allocation method (e.g., percentage distribution, subtraction, or sourcing) for processing the filtered driver and/or target data. The allocation method is chosen based on the user-defined parameters associated with the allocation rule.

At step 210, the allocation engine 108 can store data generated by the allocation process 200, which includes filtered source data, filtered driver data, or target data, in one or more operational tables in the warehouse module 106. In some embodiments, each type of data is stored in separate operational tables so as to minimize the size of each table to maximize computing speed. In some embodiments, at least a portion of the data generated by the allocation process 200 can be reported to the user by the reporting module 112.

Figure 3:
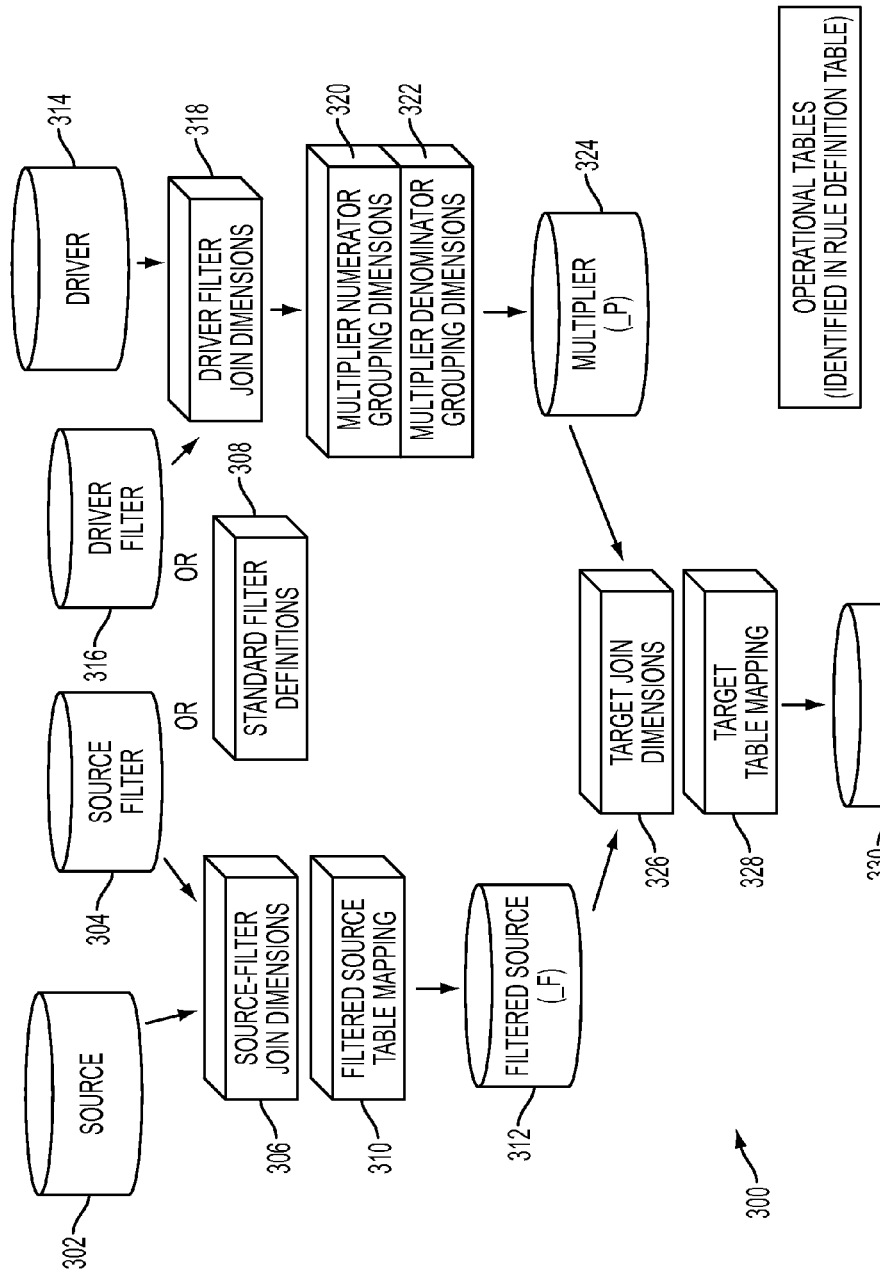
FIG. 3 shows an exemplary procedure executed by the allocation tool of FIG. 1 for processing an allocation rule related to percentage distribution.

FIG. 3 shows an exemplary procedure 300 executed by the allocation tool 100 for processing an allocation rule related to percentage distribution. During allocation processing, the allocation engine 108 can filter source data 302 with one or more custom source filters 304 to generate filtered source data 306. Alternatively, the allocation engine 108 can filter the source data 302 with one or more standard filters 308 to generate the filtered source data 306. To execute standard or custom filtering of source data, the allocation engine 108 can perform a mapping operation 310 to select the desired data and a join operation 306 to combine the selected data. The mapping operation 310 and the joining operation 306 can be defined by the metadata associated with the allocation process. The filtered source data can be stored in at least one operational table 312 in the warehouse module 106. Similar to the source data, the allocation engine 108 can filter driver data 314 with one or more custom driver filters 316 or one or more standard filters 308 to generate the filtered source data 318. Because the allocation method governing the operation of FIG. 3 is a percentage distribution method, the allocation engine 108 then transforms the filtered driver data 318 into relative percentages expressed as numerator data 320 and denominator data 322, which can be stored in one or more operational tables 324. Subsequently, the allocation engine 108 aligns and multiplies the filtered source data stored in the operational table(s) 312 with the multiplier information stored in the operational table(s) 324 to generate the target results 326. The allocation engine 108 can store the target results 326 in one or more operational tables 330 of the warehouse module 106.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components. The above described techniques can be implemented as a Software-As-A-Service (SaaS) model or using a multi-tiered approach.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A computer-implemented method for allocating input data, the method comprising:
    receiving (1) the input data comprising source data and driver data, and (2) one or more user-specified parameters for allocating the input data;
    configuring rule metadata based on the one or more user-specified parameters, wherein the rule metadata is associated with an allocation approach comprising at least one of a subtraction rule, a percent distribution rule, a sourcing rule, a division rule or a multiplication rule;
    filtering the source data and the driver data based on the rule metadata to generate filtered source data and filtered driver data;
    processing the filtered source data and the filtered driver data to generate target data, wherein processing comprises joining at least a portion of the filtered source data and at least a portion of the filtered driver data based on the allocation approach to generate the target data; and
    storing the filtered source data, the filtered driver data and the target data in separate operational tables in a database.

2. The computer-implemented method of claim 1, wherein the rule metadata defines a standard filtering method or a custom filtering method for filtering at least one of the source data or the driver data.

3. The method of claim 2, wherein the standard filtering method allows a user to select one or more dimensions, hierarchies, or members of the source data or the driver data to include or exclude in the corresponding filtered source data or filtered driver data.

4. The method of claim 2, wherein the standard filtering method allows a user to filter the source data or the driver data at a state associated with a predetermined time.

5. The method of claim 4, wherein the predetermined time comprises one of: a time of execution, a periodic time, or a user-specified time.

6. The method of claim 2, wherein the standard filtering method allows a user to filter the source data or the driver data by a business attribute.

7. The method of claim 2, wherein the custom filtering method allows a user to define one or more criteria for selecting at least a portion of the source data or the driver data to include or exclude in the corresponding filtered source data or filtered driver data.

8. The method of claim 2, wherein processing the filtered source data and the filtered driver data comprises applying the allocation approach to at least one of the filtered source data or the filtered driver data.

9. The method of claim 1, wherein the allocation approach is defined by the rule metadata based on the one or more user-specified parameters.

10. The method of claim 1, wherein at least one of the source data, the filtered source data, the driver data, the filtered driver data or the target data is used as input data for a different allocation execution.

11. The method of claim 1, further comprising storing the rule metadata in the database, wherein the rule metadata is configured to be used in a different allocation execution.

12. The method of claim 1, wherein the database is implemented in massively parallel computing architecture.

13. The method of claim 1, wherein the rule metadata specify which of the operational tables to store at least one of the source data, the filtered source data, the driver data, the filtered driver data or the target data.

14. A system for allocating input data, the system comprising:
  (a) a processor, comprising:
    an interface for receiving (1) the input data comprising source data and driver data, and (2) one or more user-specified parameters for allocating the input data;
    a rule definition module for configuring rule metadata based on the one or more user-specified parameters, wherein the rule metadata is associated with an allocation approach comprising at least one of a subtraction rule, a percent distribution rule, a sourcing rule, a division rule or a multiplication rule; and
    an engine configured to:
      filter the source data and the driver data based on the rule metadata to generate filtered source data and filtered driver data; and
      process the filtered source data and the filtered driver data based on the rule metadata to generate target data, wherein process comprises join at least a portion of the filtered source data and at least a portion of the filtered driver data based on the allocation approach to generate the target data; and
  (b) a memory operatively coupled to the processor, the memory comprising:
    a data warehouse for storing the filtered source data, the filtered driver data and the target data in separate operational tables.

15. The system of claim 14, further comprising a database for storing the user-specified parameters and the set of rule metadata, the database being located in the data warehouse.

16. The system of claim 14, wherein the data warehouse is implemented in massively-parallel computing architecture.

17. The system of claim 14, wherein the rule metadata define at least one of: 1) a filtering method for filtering at least one of the source data or the driver data, 2) an allocation method for processing at least one of the filtered source data or the filtered driver data, or 3) the operational tables for storing at least one of the source data, the filtered source data, the driver data, the filtered driver data or the target data.

18. A computer program product, tangibly embodied in a non-transitory computer readable medium, for allocating input data, the computer program product including instructions being configured to cause data processing apparatus to:
  receive (1) the input data comprising source data and driver data, and (2) one or more user-specified parameters for allocating the input data;
  configure rule metadata based on the one or more user-specified parameters, wherein the rule metadata is associated with an allocation approach comprising at least one of a subtraction rule, a percent distribution rule, a sourcing rule, a division rule or a multiplication rule;
  filter the source data and the driver data based on the rule metadata to generate filtered source data and filtered driver data;
  process the filtered source data and the filtered driver data to generate target data, wherein process comprises join at least a portion of the filtered source data and at least a portion of the filtered driver data based on the allocation approach to generate the target data; and
  store the filtered source data, the filtered driver data and the target data in separate operational tables in a database.

* * * * *